(12) United States Patent
Ayaki et al.

(10) Patent No.: US 8,605,900 B2
(45) Date of Patent: Dec. 10, 2013

(54) AV DATA RECEIVING DEVICE, AV DATA RECEIVING METHOD, AND AV DATA TRANSMISSION AND RECEIVING SYSTEM

(75) Inventors: Yasushi Ayaki, Osaka (JP); Kazunari Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 189 days.

(21) Appl. No.: 13/147,227

(22) PCT Filed: Aug. 18, 2010

(86) PCT No.: PCT/JP2010/005092
§ 371 (c)(1),
(2), (4) Date: Aug. 1, 2011

(87) PCT Pub. No.: WO2011/052121
PCT Pub. Date: May 5, 2011

(65) Prior Publication Data
US 2011/0293090 A1 Dec. 1, 2011

(30) Foreign Application Priority Data
Oct. 30, 2009 (JP) .................................. 2009-250904

(51) Int. Cl.
*H04N 7/167* (2011.01)
(52) U.S. Cl.
USPC ........................................................ 380/200
(58) Field of Classification Search
None
See application file for complete search history.

(56) References Cited

U.S. PATENT DOCUMENTS

| 7,225,164 | B1 | 5/2007 | Candelore et al. | |
|---|---|---|---|---|
| 7,298,851 | B1 | 11/2007 | Hendricks et al. | |
| 7,509,687 | B2 | 3/2009 | Ofek et al. | |
| 2002/0057799 | A1* | 5/2002 | Kohno | 380/228 |
| 2004/0158634 | A1 | 8/2004 | Saito et al. | |
| 2004/0193881 | A1 | 9/2004 | Ayaki et al. | |
| 2005/0210290 | A1 | 9/2005 | Ono et al. | |
| 2005/0216724 | A1 | 9/2005 | Isozaki et al. | |
| 2007/0022195 | A1 | 1/2007 | Kawano et al. | |
| 2008/0126561 | A1 | 5/2008 | Ryu et al. | |

(Continued)

FOREIGN PATENT DOCUMENTS

| JP | 2004-180020 | 6/2004 |
|---|---|---|
| JP | 2004-295337 | 10/2004 |

(Continued)

OTHER PUBLICATIONS

International Search Report issued Oct. 26, 2010 in International (PCT) Application No. PCT/JP2010/005092.

(Continued)

*Primary Examiner* — Brandon Hoffman
(74) *Attorney, Agent, or Firm* — Wenderoth, Lind & Ponack, L.L.P.

(57) ABSTRACT

A conventional AV data receiving device switches to a key for distribution to an outdoor device when a network environment is switched to an outdoor network environment, thus resulting in high key switching frequency. In view of this, an AV data receiving device according to the present invention determines, after switching the network environment from indoors to outdoors as a result of moving the AV data receiving device, whether or not key switching should be performed, before a command for restricting a hop count on a route from an AV data transmission device located indoors is transmitted, and performs authentication and key exchange processing for outdoor device distribution, so as to switch to the key for outdoor device distribution.

8 Claims, 9 Drawing Sheets

(56) References Cited

U.S. PATENT DOCUMENTS

| | | |
|---|---|---|
| 2008/0177998 A1 | 7/2008 | Apsangi et al. |
| 2010/0077488 A1 | 3/2010 | Fujiwara et al. |
| 2010/0268955 A1 | 10/2010 | Ohno et al. |
| 2010/0293570 A1 | 11/2010 | Teraoka et al. |

FOREIGN PATENT DOCUMENTS

| | | |
|---|---|---|
| JP | 2005-251025 | 9/2005 |
| JP | 2005-269288 | 9/2005 |
| JP | 2007-036351 | 2/2007 |
| JP | 2007-067905 | 3/2007 |
| JP | 2008-054348 | 3/2008 |
| JP | 2010-286864 | 12/2010 |
| WO | 2008/044647 | 4/2008 |
| WO | 2009/116338 | 9/2009 |

OTHER PUBLICATIONS

DTCP vol. 1 Supplement E. Mapping DTCIP to IP (Informative Version) Revision 1.2, Jun. 15, 2007, pp. 32 and 38-43.

* cited by examiner

FIG. 5
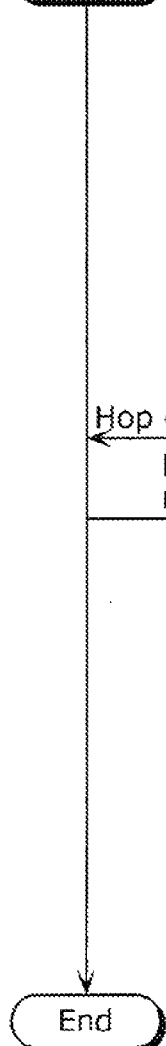
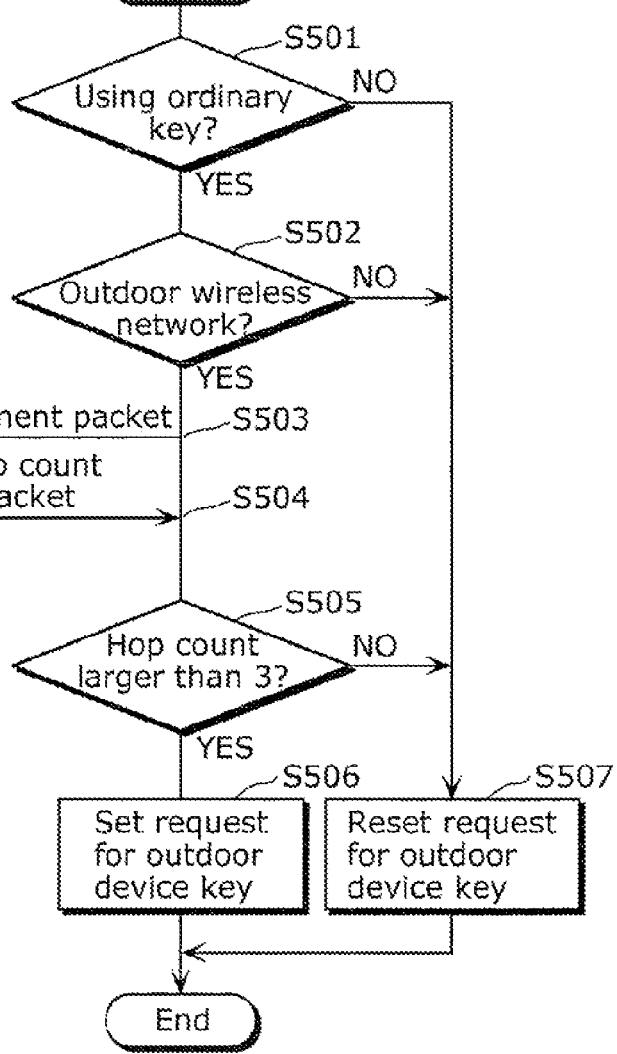

AV DATA RECEIVING DEVICE, AV DATA RECEIVING METHOD, AND AV DATA TRANSMISSION AND RECEIVING SYSTEM

TECHNICAL FIELD

The present invention relates to an audio visual (AV) data receiving device, an AV data receiving method, and an AV data transmission and receiving system, and relates particularly to an AV-data receiving device, an AV data receiving method, and an AV data transmission and receiving system for receiving and transmitting AV data protected by copyright.

BACKGROUND ART

Recently, an indoor audio visual (AV) network (hereinafter, described as a network) which connects AV devices at home through network and promotes sharing a variety of AV content between the connected AV devices is in the process of being realized.

For example, an embodiment of such an indoor AV network is to provide a router indoors and connect, to the router, through star network, an AV data receiving device such as a PC, a mobile terminal, a digital television, and an AV server which accumulates content. Here, the router is used for connecting an indoor network and an outdoor network. The AV server has a function to temporarily accumulate a variety of content obtained from the outdoor network through the router or a variety of AV content obtained through a means other than the network. Note that the means other than the network is, for example, digital broadcasting. In addition, the AV server has a function to transmit, according to a request from the AV-data receiving device such as a digital television, the variety of AV content to the AV data receiving device that requires the AV content.

On the other hand, when dealing with the AV content that requires copyright protection, it is necessary to protect the copyright of the AV content when transmitting the AV content through the network. A general method of protecting the copyright is to encrypt the data that needs copyright protection so as to prevent abuse of the data.

For such copyright protection, for example, Digital Transmission Content Protection over Internet Protocol (DTCP-IP) has been standardized (Non-Patent Literature 1). When transmitting the AV data using the DTCP-IP which has both an authentication function and a key-invalidation function, it is therefore possible to exclude an improper device and encrypt the AV data that requires copyright protection. This allows protecting the copyright of the AV data.

On the other hand, generally, use of the AV content such as a digital broadcast program is permitted for record reproduction within a scope of personal use indoors (at home). However, it is necessary to restrict the use that exceeds the scope of personal use, for example, use in which, through the Internet, the AV data recorded on the AV server provided indoors is unlimitedly distributed to an indefinite number of AV data receiving devices connected to the outdoor network. Accordingly, in the DTCT-IP, to restrict an access range of a command to be transmitted, a time to live (TTL) and a round trip time (RTT) are used.

Here, TTL restricts a hop count which is the number of routers as relay devices. Specifically, based on a value that is set for a TTL field included in an IP packet header, a maximum number of the relay devices that can relay an IP packet (maximum hop count) is set, so as to restrict the number of the relay devices (hop count). The DTCP-ID method specifies that TTL of the IP packet for transmitting an authentication and key exchange command and a decrypting key confirmation command should be 3 or below, and that a command included in an IP packet having a TTL larger than 3 should be ignored.

In addition, the DTCP-IP specifies, in authentication and key exchange processing, a command transaction for measuring RTT. Specifically, the AV data transmission device, which is to transmit the AV data, transmits an RTT measuring command to the AD data receiving device that receives the AV data, and measures RTT by measuring a length of time until a response from the AV data receiving device is received. The DTCP-IP specifies that the key exchange processing may be performed only when RTT is 7 ms or below.

Thus, according to the DTCP-IP, proximity of the AV data receiving device is judged using TTL and RTT. This allows preventing unlimited distribution of the AV data to AV data receiving devices connected to the outdoor network.

However, the DTCP-IP as described above also has a problem that such proximity checking also restricts the use of the AV content recorded on the AV server at home (indoors) within the scope of personal use, such as the user of the AV server viewing, in person, the AV content from outdoors. Thus, an AV data transmission and receiving system has been developed to allow, while using the DTCP-IP, restricting the distribution to an outdoor device, within a range that does not exceed the scope of personal use. In such an AV data transmission and receiving system, an authentication and key exchange processing unit dedicated to distribution to an outdoor receiving device is separately provided (See Patent Literature 1).

In the AV data transmission and receiving system in Patent Literature 1, the authentication and key exchange processing unit for distribution to an outdoor receiving device does not perform processing of confirming proximity between the AV data transmission device and the AV data receiving device. Instead, by performing processing for confirming identification information obtained from a shared short-distance wireless device, the AV data transmission and receiving system allows distribution of the AV data to a specific device (AV data receiving device) connected to a specific outdoor network.

The following will describe an operation performed, when moving the AV data receiving device from indoors to outdoors, in a conventional AV data transmission and receiving system, that is, the AV data transmission and receiving system for which, as described above, the authentication and key exchange processing dedicated to the distribution to an outdoor receiving device is separately provided.

FIG. 8 is a diagram showing a configuration of a conventional AV data transmission and receiving system. In FIG. 8, an AV data transmission device and an AV data receiving device that is moved from indoors to outdoors are connected to each other by a router 104 via an indoor wireless network 103, or via the indoor wireless network 103, the Internet 105, and an outdoor wireless network 106. Here, the router 104 is a bridge device to transmit and receive the data between an indoor device and an outdoor device. In addition, an AV server 101 and a mobile terminal 102 implement the authentication and key exchange processing according to the DTCP-IP and the authentication and key exchange processing dedicated to outdoor device distribution.

Indoors, the AV server 101 that is the AV data transmission device and the mobile device that is the AV data receiving device are connected to each other via the indoor wireless network 103 including a wireless medium (IEEE802.11). The router 104 is connected to the AV server 101 and the mobile terminal 102 via the indoor wireless network 103, and can be connected to an outdoor device through the Internet 105.

For example, in the case of using the mobile terminal 102 which is moved from indoors to outdoors, the mobile terminal 102 can be connected to the Internet 105 via the outdoor wireless network 106 including the wireless medium (IEEE802.11) for outdoor use, and can further access the AV server 101 located indoors via the router 104 and the indoor wireless network 103.

Accordingly, the mobile terminal 102, when transmitting the AV data indoors, checks proximity using TTL and RTT, so that ordinary authentication and key exchange processing is performed. On the other hand, when transmitting the AV data outdoors, the mobile terminal 102 performs the authentication and key exchange processing dedicated to outdoor device distribution, without checking the proximity between the outdoor device and the indoor device. In other words, processing for checking the identification information obtained from the shared short-distance wireless device is performed. This allows distribution of the AV data to a specific device (AV data receiving device) connected to the outdoor network.

FIG. 9 is a sequence diagram showing an operation performed in a conventional AV data transmission and receiving system when the mobile terminal 102 is moved from indoors to outdoors while receiving the content from the AV server 101.

First, the mobile terminal 102, which is connected to the indoor wireless network, performs, reciprocally with the AV server 101, the ordinary authentication and key exchange processing (indoor-device-authentication and key-exchange processing), to obtain an ordinary key (S901). Then, the mobile terminal 102 starts transmitting the AV data, to start decryption-receiving of the AV data (S902).

Next, when moving the mobile terminal 102 from indoors to outdoors, the mobile terminal 102 performs processing for switching the wireless network (S903). Subsequently, the mobile terminal 102 performs, reciprocally with AV server 101, processing for authenticating the outdoor device for distribution and key exchange (outdoor-device-authentication and key-exchange processing), to obtain a key for outdoor device distribution (S904). Then, the mobile terminal 102 resumes transmission of the AV data, using the obtained key for outdoor device distribution, and decryption-decodes the AV data (S905).

As described above, in the conventional AV data transmission system, in an indoor wireless network environment, transmission and receiving of the AV data is performed using an ordinary key obtained by performing the ordinary authentication and key exchange processing. On the other hand, in an outdoor wireless network environment, transmission and receiving of the AV data is performed using the key for outdoor device distribution, which is obtained by performing the authentication and key exchange processing for outdoor device distribution.

CITATION LIST

Patent Literature

[PTL 1] Japanese Unexamined Patent Application Publication No. 2008-54348 (page 9)

Non Patent Literature

[NPL 1] DTCP Volume 1 Supplement E Mapping DTCP to IP (Informative Version) Revision 1.2 (Pages 32 and 38-43)

SUMMARY OF INVENTION

Technical Problem

However, a conventional AV data transmission and receiving system performs, each time the wireless network switches, ordinary authentication and key exchange processing for obtaining the ordinary key, and the authentication and key exchange processing dedicated to outdoor distribution for obtaining the key for outdoor device distribution. The authentication and key exchange processing requires processing time, and thus resulting in a large amount of overhead for resource consumption in areas other than the original intention that is transmission and receiving of the AV data. Thus, there is a problem that the overhead increases along with increase in key switching frequency.

Thus, an object of the present invention, conceived in is view of the conditions as described above, is to provide an AV data receiving device, an AV data receiving method, and an AV data transmission and receiving system which allows reducing key switching frequency and overheads resulting from the key switching.

Solution to Problem

In order to achieve the above object, an AV data receiving device according to an aspect of the present invention is an audio-visual (AV) data receiving device including: an AV data receiving unit which receives, from an AV data transmission device, AV data encrypted and transmitted by the AV data transmission device according to a method for protecting copyright on a network; a decryption unit which decrypts the encrypted AV data; a relay device number checking unit which checks whether the number of relay devices which relay transmission between the AV data transmission device and the AV data receiving device on the network is equal to or smaller than a predetermined value; a command transmission and receiving unit which transmits and receives a command to and from the AV data transmission device; a first authentication and key exchange unit which performs first authentication for checking the number of the relay devices by causing the command transmission and receiving unit to transmit and receive the command to and from the AV data transmission device, and exchanges first key information with the AV data transmission device; a second authentication and key exchange unit which performs second authentication not involving checking of the number of the relay devices and exchange second key information, reciprocally with the AV data transmission device; and a key information switching unit which determines whether or not the first key information should be switched to the second key information, and in the AV data receiving device, before the command transmission and receiving unit is caused to transmit and receive a command for restricting the number of the relay devices to and from the AV data transmission device, the key information switching unit causes the relay device number checking unit to check the number of the relay devices, and determines, when the number of the relay devices is larger than the predetermined value, that the first key information should be switched to the second key information, so that the command transmission and receiving unit is not caused to transmit and receive the command to and from the AV data transmission device, and the second authentication and key exchange unit performs the second authentication and exchanges the second key information, according to the determination by the key information switching unit, and the decryption unit decrypts the encrypted AV data, using the second key information obtained by the second authentication and key exchange unit.

With this configuration, it is possible to realize an AV data receiving device which reduces frequency of key switching and overheads resulting from the key switching.

In addition, to achieve the object above, an AV data receiving method according to an aspect of the present invention is an AV data receiving method used for an audio-visual (AV) data receiving device, and the method includes: receiving, from an AV data transmission device, AV data encrypted and transmitted by the AV transmission device according to a method for protecting copyright on a network; decrypting the encrypted AV data; checking whether the number of relay devices which relay transmission between the AV data transmission device and the AV data receiving device on the network is equal to or smaller than a predetermined value; transmitting and receiving a command to and from the AV data transmission device; performing first authentication for checking the number of the relay devices by causing the command to be transmitted between the AV data transmission device and the AV data receiving device in the transmitting and receiving, and exchanging first key information with the AV data transmission device; performing second authentication not involving checking of the number of the relay devices and exchanging second key information, reciprocally with the AV data transmission device; and determining whether or not the first key information should be switched to the second key information, and in the AV data receiving method, in the determining, the number of the relay devices is checked in the checking before a command for restricting the number of the relay devices is caused to be transmitted and received to and from the AV data transmission device in the transmitting and receiving, and it is determined, when the number of the relay devices is larger than the predetermined value, that the first key information should be switched to the second key information, so that the command is not transmitted or received to and from the AV data transmission device in the transmitting and receiving, and in the performing second authentication, the second authentication is performed and the second key information is exchanged, according to the determination performed in the determining, and in the decrypting, the encrypted AV data is decrypted using the second key information obtained in the performing second authentication.

In addition, an AV data transmission and receiving system according to an aspect of the present invention is an audio-visual (AV) data transmission and receiving system in which an AV data transmission device and an AV data receiving device transmit and receive AV data to and from each other via an indoor or outdoor network, the AV data transmission device transmitting the AV data, and the AV data receiving device receiving the AV data, and in the AV data transmission and receiving system, the AV data transmission device includes: an encryption unit which encrypts the AV data according to a method for protecting copyright on a network; an AV data transmission unit which transmits, to the AV data receiving device, the AV data encrypted according to the method; a first decryption unit which decrypts the encrypted AV data; a first relay device number checking unit which checks that the number of relay devices which relay transmission between the AV data transmission device and the AV data receiving device on the network is equal to or smaller than a predetermined value; a first command transmission and receiving unit which transmits and receives a command to and from the AV data receiving device; a first authentication and key exchange unit which performs first authentication for checking the number of the relay devices by causing the first command transmission and receiving unit to transmit and receive the command to and from the AV data transmission device, and exchanges first key information with the AV data transmission device; a second authentication and key exchange unit which performs second authentication not involving checking of the number of relay devices and exchanges the second key information, reciprocally with the AV data transmission device; and an authentication and key exchange selection unit which selects and causes to operate, according to the command received by the first command transmission and receiving unit, one of the first authentication and key exchange unit and the second authentication and key exchange unit, and the AV data receiving device includes: an AV data receiving unit which receives, from the AV data transmission device, the AV data encrypted according to the method; a second decryption unit which decrypts the encrypted AV data; a second relay device number checking unit which checks whether the number of the relay devices which relay transmission between the AV data transmission device and the AV data receiving device on the network is equal to or smaller than a predetermined value; a second command transmission and receiving unit which transmits and receives the command to and from the AV data transmission device; a third authentication and key exchange unit which performs the first authentication for checking the number of the relay devices by causing the second command transmission and receiving unit to transmit and receive the command to and from the AV data transmission device, and exchanges the first key information; a fourth authentication and key exchange unit which performs the second authentication not involving checking of the number of relay devices and exchanges the second key information, reciprocally with the AV data transmission device; and a key information switching unit which determines whether or not the first key information should be switched to the second key information, and the key information switching unit causes the relay device number checking unit to check the number of the relay devices, before the second command transmission and receiving unit is caused to transmit and receive the command to and from the AV data transmission device, and determines, when the number of the relay devices is larger than the predetermined value, that the first key information should be switched to the second key information, so that the second command transmission and receiving unit is not caused to transmit and receive the command to and from the second command transmission and receiving unit, and the fourth authentication and key exchange unit performs the second authentication and exchanges the second key information, according to the determination by the key information switching unit, and the second decryption unit decrypts the encrypted AV data, using the second key information obtained by the second authentication and key exchange unit.

Note that the present invention can be realized not only as a device but also as an integrated circuit including a processing unit included in such a device, and can also be realized as a method including, as steps, the processing unit included in the device, as a program which causes a computer to execute these steps, and as information, data, or a signal representing the program. In addition, such program, information, data, and signal may be distributed through a recording medium such as a CD-ROM or a communication medium such as the Internet.

Advantageous Effects of Invention

According to the present invention, it is possible to realize an AV data receiving device, an AV data receiving method, and an AV data transmission and receiving system which reduce frequency of key switching and thus reduce overheads resulting from the key switching.

Specifically, an advantageous effect of the present invention is to reduce, while using the DTCP-IP, the frequency of key switching between an indoor network environment and an outdoor network environment to a maximum extent within an allowable range in accordance with the DTCP-IP. This allows reducing overheads resulting from the key switching.

BRIEF DESCRIPTION OF DRAWINGS

FIG. 5 is a diagram showing an execution sequence for describing in detail key switching determination processing performed by a key switching determination unit in the AV data receiving device according to the first embodiment of the present invention.

DESCRIPTION OF EMBODIMENTS

Hereinafter, embodiments of the present invention will be described in detail with reference to FIGS. 1 to 6.

Embodiment 1

The following will describe an embodiment of the present invention in detail with reference to the drawings.

Figure 1:
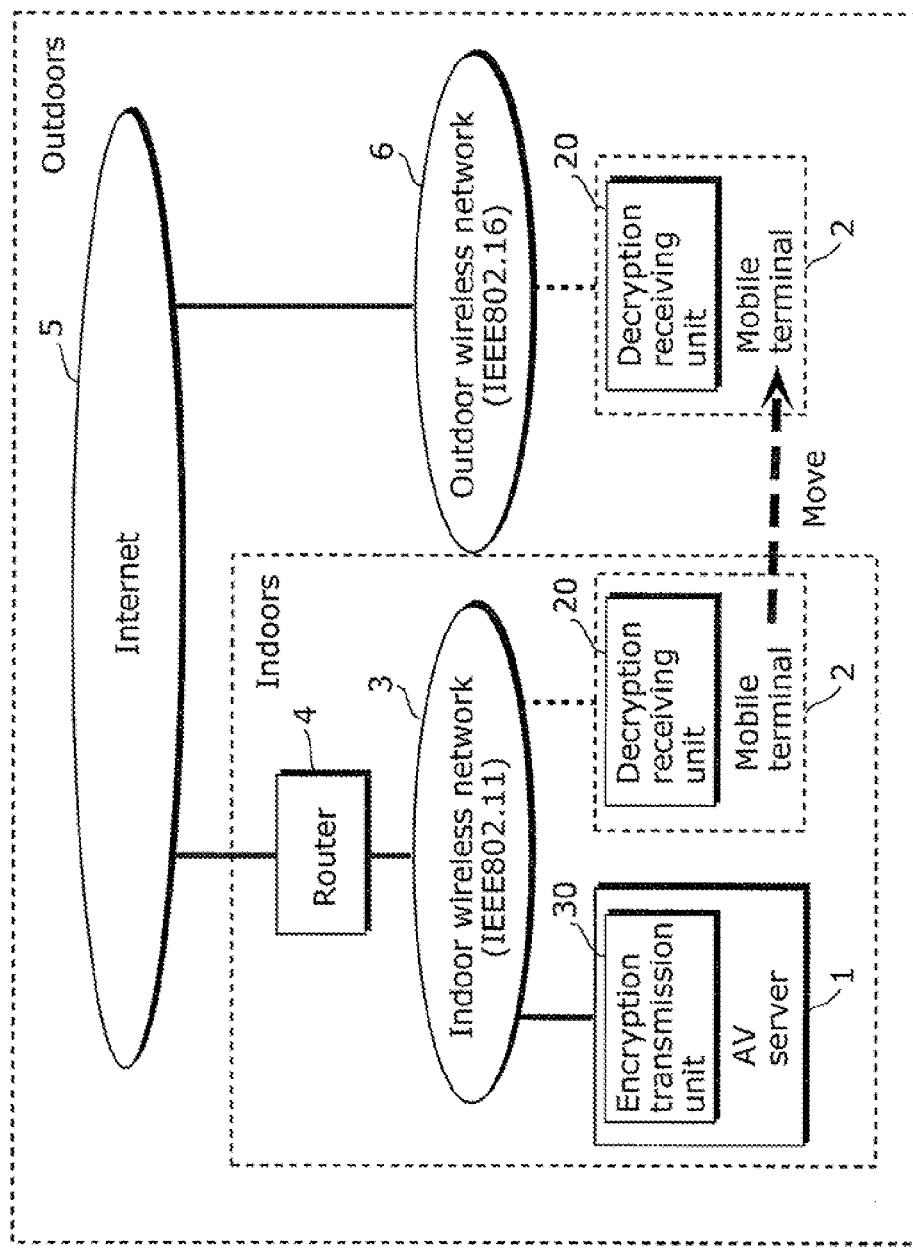
FIG. 1 is a diagram showing an AV data transmission and receiving system according to a first embodiment of the present invention.

FIG. 1 is a diagram showing an AV data transmission and receiving system according to a first embodiment of the present invention. As shown in FIG. 1, an AV data transmission device and an AV data receiving device that is to be moved from indoors to outdoors are connected to each other by a router 4 via an indoor wireless network 3, or via the indoor wireless network 3, the Internet 5, and an outdoor wireless network 6.

Here, the indoor wireless network 3 is, for example, a wireless network according to IEEE802.11, and the outdoor wireless network 6 is, for example, a wireless network according to IEEE802.16.

The AV server 1 is an example of the AV data transmission device provided at user's home (indoors), and is connected to the router 4 and the indoor wireless network 3. The AV server 1, including an encryption transmission unit 30, encrypts AV data according to the DTCP-IP that is a method to protect copyright on the network, and transmits the encrypted AV data.

The router 4 can be connected to an outdoor device via the Internet 5 and the outdoor wireless network 6. In addition, the router 4 can be connected to an indoor device, for example, the AV server 1 via the indoor wireless network 3.

The mobile terminal 2 is an example of the AV data receiving device, and is used by the user carrying the mobile terminal 2. The mobile terminal 2, which includes a decryption receiving unit 20, communicates with the indoor device, and receives and decrypts the AV data encrypted according to the method of protecting copyright on the network. The mobile terminal 2 communicates with the indoor device that is, for example, the AV server 1 via the indoor wireless network 3 when the user is at home (indoors), and communicates with the indoor device via the outdoor wireless network 6 when the user moves from indoors to outdoors carrying the mobile terminal 2.

Specifically, when the mobile terminal 2 is located indoors, the mobile terminal 2 can be connected to, for example, the AV server 1 by the router 4 via the indoor wireless network 3. In addition, when the mobile terminal 2 is located outdoors, the mobile terminal 2 can be connected to the AV server 1 by the router 4 via the internet 5 and the outdoor wireless network 6.

Thus configured is the AV data transmission and receiving system which can, using the DTCP-IP, exclude an improper device, and encrypt, transmit, and receive the AV data that requires copyright protection Note that in this AV data transmission and receiving system, even when the mobile terminal 2 is carried from indoors to outdoors, and the indoor wireless network 3 is switched to the outdoor wireless network 6, the mobile terminal 2 operates assuming that the mobile terminal 2 is quasi-connected to the indoor wireless network 3 within the allowable range of the DTCP-IP. In other words, the mobile terminal 2 continues using the (ordinary) key for indoor device distribution without switching to the key for outdoor device distribution, within the allowable range of the DTCP-IP. This allows reducing the frequency of key switching, thus reducing overheads resulting from the key switching.

The following will describe a main configuration of the AV data transmission device and the AV data receiving device which realize this.

Figure 2:
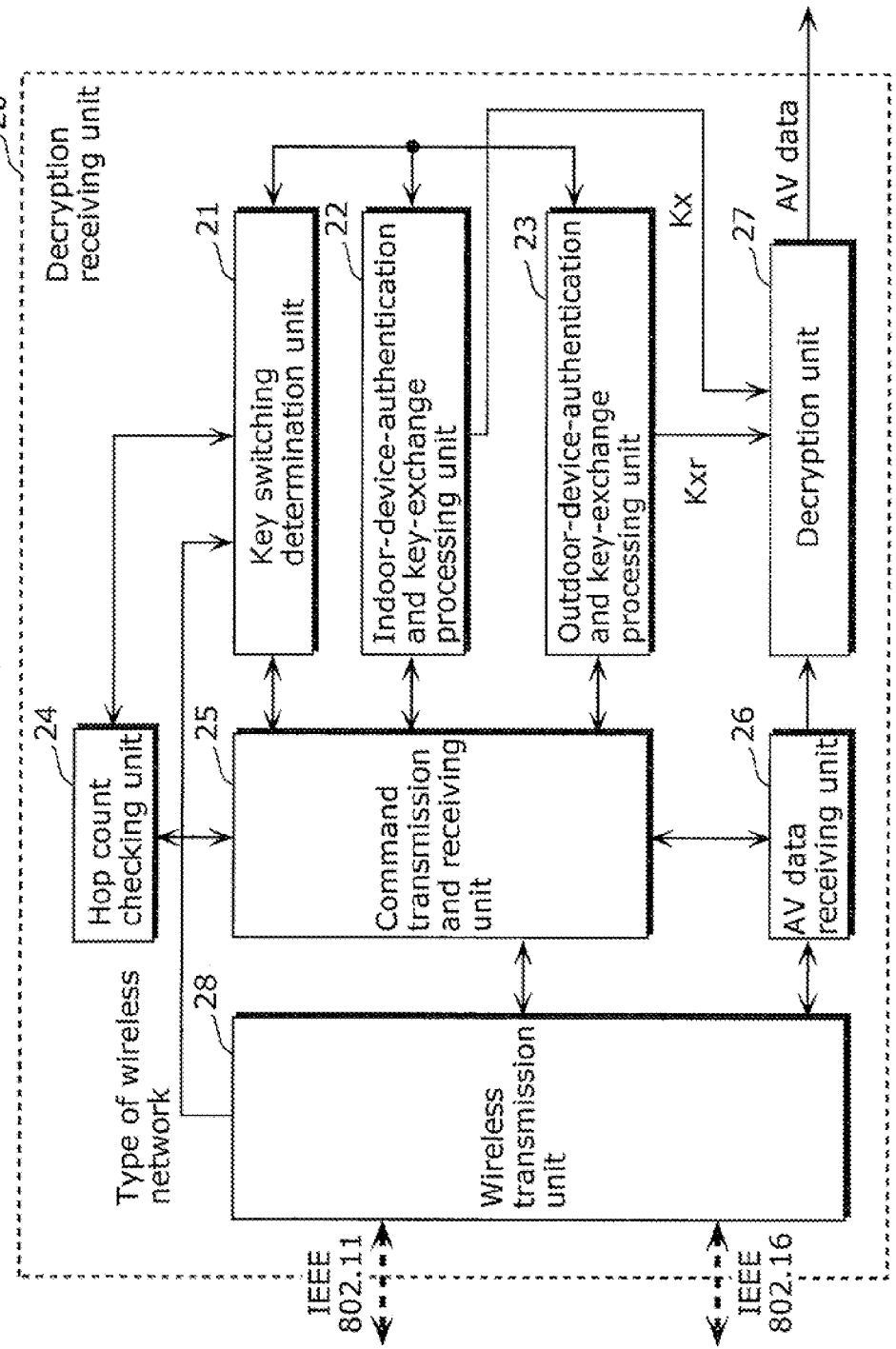
FIG. 2 is a block diagram showing a configuration of a decryption receiving unit in an AV data receiving device according to the first embodiment of the present invention.

FIG. 2 is a block diagram showing a configuration of a decryption receiving unit in the AV data receiving device according to the first embodiment of the present invention.

The decryption receiving unit 20, which is included in the mobile terminal 2 that is the AV data receiving device, includes: a key switching determination unit 21; an indoor-device-authentication and key-exchange processing unit 22; an outdoor-device-authentication and key-exchange processing unit 23; a hop count checking unit 24; a command transmission and receiving unit 25; an AV data receiving unit 26; a decryption unit 27; and a wireless transmission unit 28.

Here, the key switching determination unit 21 corresponds to the key information switching unit according to the present invention, the indoor-device-authentication and key-exchange processing unit 22 corresponds to the first authentication and key exchange processing unit, the outdoor-device-authentication and key-exchange processing unit 23 corresponds to the second authentication and key exchange processing unit, the hop count checking unit 24 corresponds to the relay device number checking unit, the command transmission and receiving unit 25 corresponds to the command transmission and receiving unit, the AV data receiving unit 26 corresponds to the AV data receiving unit, and the decryption unit 27 corresponds to the decryption unit, respectively.

The key switching determination unit 21 which is a characteristic constituent element of the present invention determines, upon receiving a switching confirmation request, whether or not switching to an outdoor device key should be performed. Specifically, the key switching determination unit 21 receives, from the command transmission and receiving unit 25, the switching confirmation request for confirming whether or not key switching is necessary. In this case, before the command transmission and receiving unit 25 is caused to transmit and receive a command for restricting a hop count (the number of relay devices) to and from the AV server 1, confirmation is performed as to: a type of the key currently used for the decryption in the decryption unit 27; a type of the wireless network currently used by the wireless transmission unit 28 for the reception; and the hop count received by the hop count checking unit 24. Then, the key switching determination unit 21 determines whether or not switching to the outdoor device key should be performed, according to the type of the key, the type of the wireless network, and the hop count that are confirmed. The key switching determination unit 21 notifies the command transmission and receiving unit 25 and the outdoor-device-authentication and key-exchange processing unit 23 of a result of the determination as to whether or not switching to the outdoor device key should be performed.

For example, the key switching determination unit 21 causes the hop count checking unit 24 to check the hop count (the number of relay devices), and when the hop count is larger than a predetermined value 3, the key switching determination unit 21 determines that switching to the outdoor device key should be performed, and prevents the command transmission and receiving unit 25 from transmitting and receiving the command to and from the AV server 1. In addition, the key switching determination unit 21 causes the hop count checking unit 24 to confirm the hop count (the number of relay devices), and when the hop count is equal to or smaller than 3 that is the predetermined value, the key switching determination unit 21 determines that the switching to the outdoor device key should not be performed, and causes the command transmission and receiving unit 25 to directly transmit or receive the command to and from the AV server 1.

By causing the command transmission and receiving unit 25 to transmit and receive the command to and from the AV server 1, the indoor-device-authentication and key-exchange processing unit performs indoor-device-authentication and key-exchange processing which is to confirm the hop count (the number of relay devices) and exchange key information. Specifically, the indoor-device-authentication and key-exchange processing unit 22 performs, via the command transmission and receiving device 25 and the wireless transmission unit 28, the indoor-device-authentication and key-exchange processing according to the DTCP-IP, reciprocally with the AV server 1 that is the AV data transmission device. The indoor-device-authentication and key-exchange processing unit 22 outputs, to the decryption unit 27, an ordinary key (Kx) that is obtained by performing the indoor-device-authentication and key-exchange processing.

By causing the command transmission and receiving unit 25 to transmit and receive the command to and from the AV server 1, the outdoor-device-authentication and key-exchange processing unit 23 performs the outdoor-device-authentication and key-exchange processing which is to perform the outdoor device authentication processing without checking the hop count (the number of relay to devices) and exchange key information. Specifically, when receiving, from the key switching determination unit 21, the determination result that switching to the outdoor device should be performed, the outdoor-device-authentication and key-exchange processing unit 23 performs, reciprocally with the AV server 1, the outdoor-device-authentication and key-exchange processing via the command transmission and receiving unit 25 and the wireless transmission unit 28. The outdoor-device-authentication and key-exchange processing unit 23 outputs, to the decryption unit 27, an outdoor device key (Kxr) that is obtained by performing the outdoor-device-authentication and key-exchange processing.

The hop count checking unit 24 is a characteristic constituent element of the present invention. The hop count checking unit 24 confirms whether the hop count (the number of relay devices) that is present on a route from the AV server 1 in the network is equal to or smaller than the predetermined value 3. Specifically, the hop count checking unit 24 is controlled by the key switching determination unit 21, transmits a hop count measurement packet to the AV server 1 via the command transmission and receiving unit 25 and the wireless transmission unit 28, and receives a command response from the AV server 1. The hop count checking unit 24 calculates the hop count based on a difference between a TTL value at the time of the AV server 1 transmitting the command, which is included in the received command response, and a TTL value at the time of the hop count checking unit 24 receiving the command response, and outputs the calculated hop count to the key switching determination unit 21.

The command transmission and receiving unit 25 transmits and receives the command to and from the AV server 1 via the wireless transmission unit 28. Specifically, the command transmission and receiving unit 25 is controlled by the indoor-device-authentication and key-exchange processing unit 22, the outdoor-device-authentication and key-exchange processing unit 23, the hop count checking unit 24, and the AV data receiving unit 26, and performs transmission and receiving processing which is to transmit and receive different types of commands and command responses to and from the AV server 1 via the wireless transmission unit 28. For example, it is assumed that the command transmission and receiving unit 25 receives, from the AV data receiving unit 26, a decryption key confirmation command (CONT_KEY_CONF) to confirm whether the key used for the decryption is valid or not. In this case, prior to transmitting the decryption key confirmation command to the AV server 1, the command transmission and receiving unit 25 transmits, to the key switching determination unit 21, the switching confirmation request to confirm whether or not key switching is necessary. When the key switching determination unit 21 determines that key switching is necessary, the command transmission and receiving unit 25 does not transmit the decryption key confirmation command to the AV server 1. In addition, for example, the command transmission and receiving unit 25 transmits and receives the authentication and key exchange command related to the indoor device key and the decryption key confirmation command as follows. In transmission, the command transmission and receiving unit 25 sets, to 3, the TTL of the IP packet corresponding to the authentication and key exchange command or the decryption key confirmation command that is to be transmitted. On the other hand, in receiving, the command transmission and receiving unit 25 checks the TTL of the IP packet corresponding to the authentication and key exchange command or the decryption key confirmation command that is received, and discards the command as an improper command when the TTL is 4 or above.

The AV data receiving unit 26 transmits an AV data obtainment request to the AV server 1 via the wireless transmission unit 28. Then, the AV data receiving unit 26 receives, from the AV server 1, encrypted AV data and header information including decryption key generation information (Nc), and outputs these information items to the decryption unit 27. For example, the AV data receiving unit 26 confirms a monotonic increase in Nc, and outputs, when a discontinuity of Nc occurs, the decryption key confirmation command to the command transmission and receiving unit 25. The command transmission and receiving unit 25 transmits the decryption key confirmation command to the AV server 1 via the wireless transmission unit 28. Then, the AV data receiving unit 26 performs decryption key confirmation processing to confirm whether or not the key that is currently used for the decryption is valid. For is example, when confirming that the key currently used for the decryption is invalid, the AV data receiving unit 26 stops output of the encrypted AV data to the decryption unit 27, to cause the decryption unit 27 to stop the decryption.

The decryption unit 27 receives inputs of the header information from the AV data receiving unit 26 and the key information from the indoor-device-authentication and key-exchange processing unit 22 or the outdoor-device-authentication and key-exchange processing unit 23. The decryption unit 27 generates a decryption key using the key information that is input, and decrypts and outputs the encrypted AV data received form the AV data receiving unit 26.

The wireless transmission unit 28 is a wireless transmission unit compatible with, for example, both the indoor wireless network 3 in accordance with IEEE802.11 standard and the outdoor wireless network 6 in accordance with IEEE802.16. The wireless transmission unit 28 transmits and receives a command and a command response to and from the AV server 1, switching the wireless network to be used according to the condition of wave reception, and further receives the AV data from the AV server 1. In addition, the wireless transmission unit 28 outputs the type of the wireless network currently used, to the key switching determination unit 21.

Thus configured is the AV data receiving device according to the first embodiment of the present invention.

Figure 3:
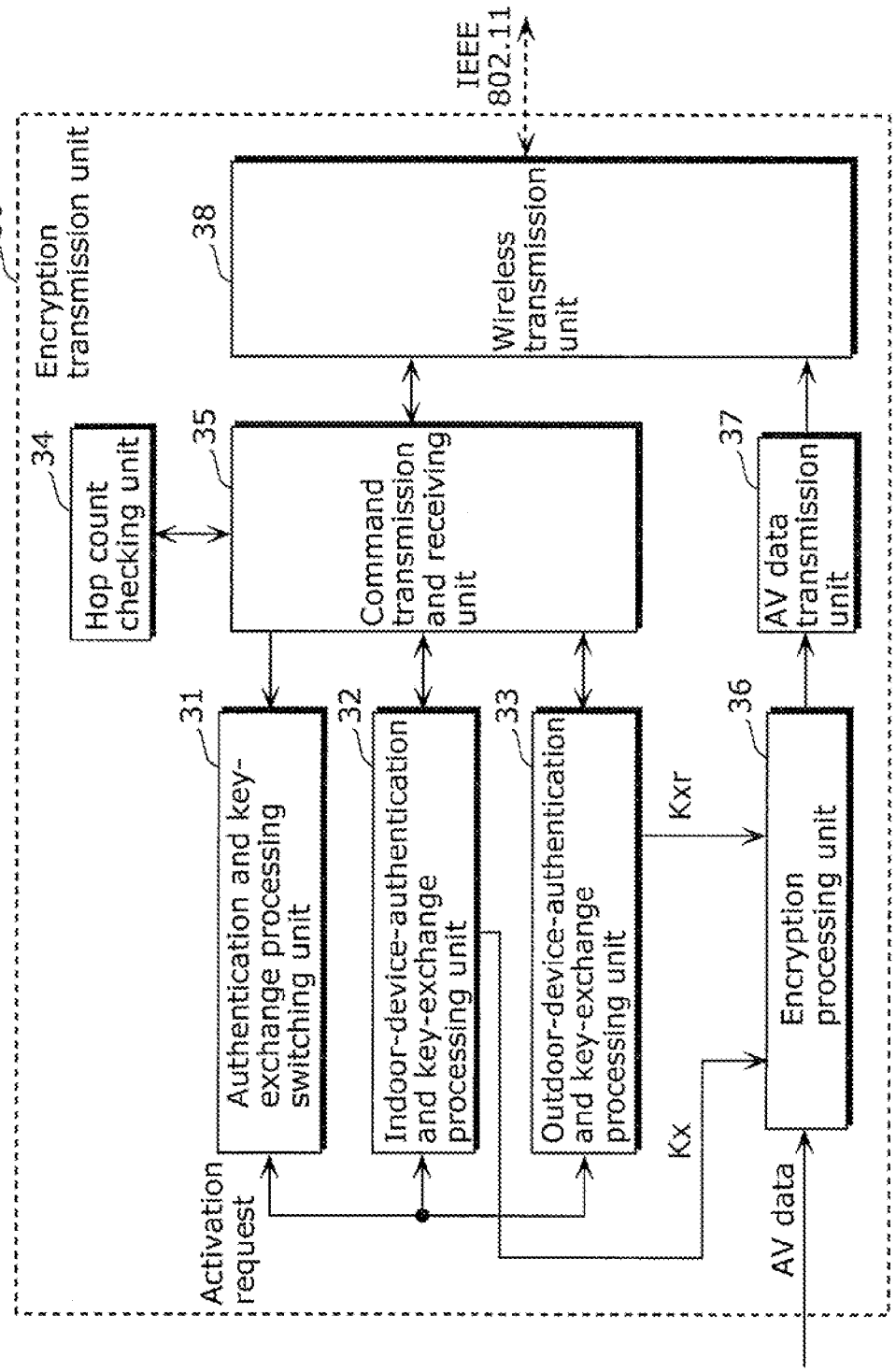
FIG. 3 is a block diagram showing a configuration of an encryption transmission unit in an AV data transmission device according to the first embodiment of the present invention.

FIG. 3 is a block diagram showing a configuration of an encryption transmission unit in the AV data transmission device according to the first embodiment of the present invention.

The encryption transmission unit 30, which is included in the AV server 1 that is the AV data transmission device, includes: an authentication and key-exchange processing switching unit 31; an indoor-device-authentication and key-exchange processing unit 32; an outdoor-device-authentication and key-exchange processing unit 33; a hop count checking unit 34; a command transmission and receiving unit 35; an encryption unit 36; an AV data transmission unit 37; and a wireless transmission unit 38.

Here, the authentication and key-exchange processing switching unit 31 corresponds to an authentication and key exchange selection unit according to the AV data transmission and receiving system in the present invention, the indoor-device-authentication and key-exchange processing unit 32 corresponds to the first authentication and key exchange processing unit, the outdoor-device-authentication and key-exchange processing unit 33 corresponds to the second authentication and key exchange unit, the hop count checking unit 34 corresponds to the first relay device number checking unit, the command transmission and receiving unit corresponds to the first command transmission and receiving unit, the encryption unit 36 corresponds to the encryption unit, and the AV data transmission unit 37 corresponds to the AV data receiving unit, respectively.

The authentication and key-exchange processing switching unit 31 receives an authentication and key exchange activation command via the wireless transmission unit 38 and the command transmission and receiving unit 35. The authentication and key-exchange processing switching unit 31 selects, according to the type of the authentication and key exchange activation command that is received, the authentication and key exchange processing to be performed, and outputs an activation request to the indoor-device-authentication and key-exchange processing unit 32 or the outdoor-device-authentication and key-exchange processing unit 33.

By causing the command transmission and receiving unit 35 to transmit and receive to and from the mobile terminal 2, the indoor-device-authentication and key-exchange processing unit 32 performs the indoor-device-authentication and key-exchange processing which is to perform indoor authentication processing in which the hop count (the number of relay devices) is checked and exchange key information. Specifically, in response to the activation request from the authentication and key-exchange processing switching unit 31, the indoor-device-authentication and key-exchange is processing unit 32 performs, reciprocally with the mobile terminal 2, the indoor-device-authentication and key-exchange processing according to the DTCP-IP via the command transmission and receiving unit 35 and the wireless transmission unit 38, and transmits the ordinary key (Kx) to the mobile terminal 2. In addition, the ordinary key (Kx) is output to the encryption unit 36.

By causing the command transmission and receiving unit 35 to transmit and receive the command to and from the mobile terminal 2, the outdoor-device-authentication and key-exchange processing unit 33 performs the outdoor-device-authentication and key-exchange processing which is to perform outdoor authentication processing in which the hop count (the number of relay devices) is not checked and exchange the key information. Specifically, in response to the activation request from the authentication and key-exchange processing switching unit 31, the outdoor-device-authentication and key-exchange processing unit 33 performs, reciprocally with the mobile terminal 2, the outdoor-device-authentication and key-exchange processing via the command transmission and receiving unit 35 and the wireless transmission unit 38, and transmits the outdoor device key (Kxr) to the mobile terminal 2. In addition, the outdoor device key (Kxr) is output to the encryption unit 36.

The hop count checking unit 34 confirms whether or not the hop count (the number of relay devices) that is present on a route from the mobile terminal 2 in the network is equal to or smaller than the predetermined value 3. Specifically, the hop count checking unit 34 receives the hop count measurement packet via the command transmission and receiving unit 35 and the wireless transmission unit 38. Then, when transmitting the command response, the hop count checking unit 34 sets the TTL value in the command response and transmits the command response to the mobile terminal 2.

The command transmission and receiving unit 35 transmits and receives the command to and from the mobile terminal 2 via the wireless transmission unit 38. Specifically, the command transmission and receiving unit 35 is controlled by the indoor-device-authentication and key-exchange processing unit 32, is the outdoor-device-authentication and key-exchange processing unit 33, and the hop count checking unit 34, and performs transmission and receiving processing which is to transmit and receive various types of commands and command responses to and from the mobile terminal 2 via the wireless transmission unit 38.

The encryption unit 36 encrypts the AV data according to the DTCP-IP that is a method for protecting copyright on the network. Specifically, the encryption unit 36 generates an encryption key, using key information from the indoor-device-authentication and key-exchange processing unit 32 or the outdoor-device-authentication and key-exchange processing unit 33, and encryption key generation information (Nc). The encryption unit 36 encrypts the AV data using the generated encryption key and outputs the encrypted AV data to the AV data transmission unit 37. In addition, the encryption unit 36 outputs the Nc used for the encryption, to the AV data transmission unit 37 as decryption key generation information (Nc).

The AV data transmission unit 37 receives an AV data obtainment request from the mobile terminal 2. The AV data transmission unit 37, in response to the AV data obtainment request that is received, receives the decryption key generation information and the encrypted AV data from the encryption unit 36, packetizes the encrypted AV data and adds the decryption key generation information to the encrypted AV data that is packetized, and transmits the AV data, which is encrypted and packetized, to the mobile terminal 2 via the wireless transmission unit 38.

The wireless transmission unit 38 is a wireless transmission unit compatible with, for example, the indoor wireless network 3 in accordance with IEEE802.11 standard. The wireless transmission unit 38 transmits and receives a command and a command response to and from the mobile terminal 2 via the indoor wireless network 3, and transmits the AV data to the mobile terminal 2.

Thus configured is the AV data transmission device according to the first embodiment of the present invention.

The following will describe an operation of the AV data transmission and receiving system which includes the AV data transmission device and the AV data receiving device that are configured as described above.

Figure 4:
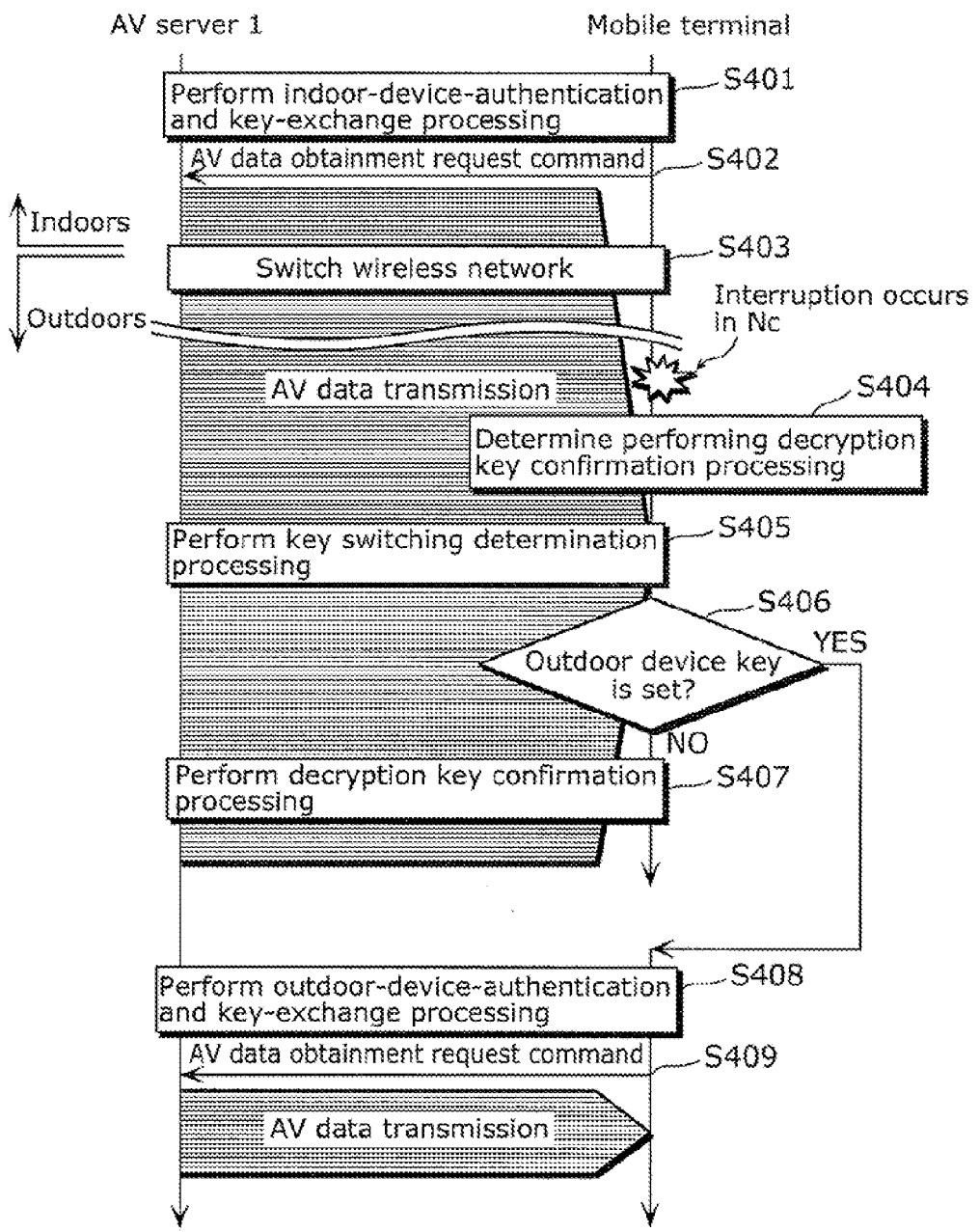
FIG. 4 is a diagram showing an execution sequence of the AV data transmission and receiving system according to the first embodiment of the present invention.

FIG. 4 is a diagram showing an execution sequence of the AV data transmission and receiving system according to the first embodiment of the present invention.

First, it is assumed that the mobile terminal 2 is located indoors as shown in FIG. 1. The mobile terminal 2, when connected to the indoor wireless network, performs the indoor-device-authentication and key-exchange processing (S401). Specifically, the indoor-device-authentication and key-exchange processing unit 22 performs, reciprocally with the AV server 1 that is the data transmission device, the ordinary authentication and key exchange processing, that is, the indoor-device-authentication and key-exchange processing according to the DTCP-IP via the command transmission and receiving device 25 and the wireless transmission unit 28. Then, the ordinary key (Kx) is obtained.

Subsequently, the mobile terminal 2 transmits an AV data obtainment request command to the AV server 1 (S402), receives the AV data from the AV server 1, and starts decrypting the AV data. Specifically, in the mobile terminal 2, the AV data receiving unit 26 transmits the AV data obtainment request to the AV server 1 via the wireless transmission unit 28. Then, the AV data receiving unit 26 receives, from the AV server 1, encrypted AV data and header information including decryption key generation information (Nc), and outputs the AV data and the header information to the decryption unit 27. The decryption unit 27 generates a decryption key using the decryption key generation information (Nc) that is input, and decrypts the encrypted AV data received form the AV data receiving unit 26.

Next, when moving the mobile terminal 2 from indoors to outdoors, the mobile terminal 2 switches the wireless network (S403). Specifically, in the mobile terminal 2, the wireless transmission unit 28 performs wireless network switching processing which is to switch the wireless network from the indoor wireless network 3 to the outdoor wireless network 6.

Here, for example, when transmission of the AV data is interrupted as a result of switching the wireless network and so on, there is a possibility of discontinuity occurring in the Nc included in the header information received from the AV server 1 by the mobile device 2. In this case, the mobile terminal 2 determines that it is necessary to perform decryption key confirmation processing (S404). The mobile terminal 2, before the decryption key confirmation processing is performed, performs, first, the key switching determination processing reciprocally with AV server 1 (S405). Then, the mobile terminal 2 confirms whether or not the request for the outdoor device key is set as a result of the key switching determination processing (S406).

Specifically, in the mobile terminal 2, upon confirming the discontinuity in the Nc included in the header information received from the AV server 1, the AV data receiving unit 26 outputs the decryption key confirmation command to the command transmission and receiving unit 25. Prior to transmitting the decryption key confirmation command to the AV server 1, the command transmission and receiving unit 25 transmits the switching confirmation request to the key switching determination unit 21. Upon receiving the switching confirmation request from the command transmission and receiving unit 25, the key switching determination unit 21 confirms: the type of the key currently used for the decryption processing in the decryption unit 27; a wireless network type indicating the type of the wireless network currently used by the wireless transmission unit 28 for the reception; and the hop count received by the hop count checking unit 24. Then, the key switching determination unit 21 determines whether or not switching to the outdoor device key should be performed, according to the wireless network type and the hop count that are confirmed.

Here, the key switching determination processing performed by the key switching determination unit 21 in the mobile terminal 2 is described in detail.

FIG. 5 is a diagram showing an execution sequence for describing in detail the key switching determination processing performed by the key switching determination unit in the AV data receiving device according to the first embodiment of the present invention. FIG. 5 shows processing in which: the key switching determination unit 21 receives the switching confirmation request from the command transmission and receiving unit 25, and performs the key switching determination processing reciprocally with the AV server 1 as below. In other words, FIG. 5 shows the processing in which the key switching determination unit 21 determines, as follows, whether or not switching to the outdoor device key should be performed.

First, in the mobile terminal 2, the key switching determination unit 21 confirms whether the type of the key currently used by the decryption unit 27 for the decryption process is the ordinary key (Kx) or the outdoor device key (Kxr) (S501). Here, when confirming that the key is the outdoor device key (NO in S501), the key switching determination unit 21 resets a request for the outdoor device key (S507). In other words, in the determination as to whether or not switching to the outdoor device key should be performed, the key switching determination unit 21 determines that switching to the outdoor device key is not necessary.

Next, when confirming that the key is the ordinary key (YES in S501), the key switching determination unit 21 confirms whether or not the type of the wireless network currently used by the wireless transmission unit 28 for the reception is the outdoor wireless network 6 (S502). Here, when confirming that the indoor wireless network 3, instead of the outdoor wireless network 6, is used (NO in S502), the key switching determination unit 21 resets the request for the outdoor device key (S507). In other words, in the determination as to whether or not switching to the outdoor device key should be performed, the key switching determination unit 21 determines that switching to the outdoor device key is not necessary.

Next, when confirming that the outdoor wireless network 6 is used (YES in S502), the key switching determination unit 21 measures the hop count by causing the hop count checking unit 24 to transmit a hop count measurement packet to the AV server 1 (S503), and causing the hop count checking unit 24 to receive a response to the hop count measurement packet (S504).

Next, the key switching determination unit 21 determines whether or not the measured hop count is larger than 3 (S505). Here, when determining that the measured hop count is 3 or below (NO in S505), the key switching determination unit 21 resets the request for the outdoor device key (S507). In other words, in the determination as to whether or not switching to the outdoor device key should be performed, the key switching determination unit 21 determines that switching to the outdoor device key is not necessary.

Next, when determining that the measured hop count is larger than 3 (YES in S505), the key switching determination unit 21 finishes the processing by setting the request for the outdoor device key (S506). Note that the key switching determination unit 21 finishes the processing by setting the request for the outdoor device key because it is possible to predict, from the restriction on the hop count, a failure in transmitting the command for the indoor device having a restriction on the hop count. Accordingly, in the determination as to whether or not switching to the outdoor device key should be performed, the key switching determination unit 21 determines that switching to the outdoor device key is necessary.

As described above, the key switching determination unit 21 in the mobile terminal 2 performs the key switching determination processing reciprocally with the AV server 1.

Next, when confirming that the request for the outdoor device key is not set, that is, the request for the outdoor device key has been reset (NO in S406), the mobile terminal 2 directly performs the decryption key confirmation processing (S407) and subsequently transmits the AV data. Specifically, in the mobile terminal 2, since the key switching determination unit 21 determines that switching to the outdoor device key is not necessary, the command transmission and receiving unit 25 performs the decryption key confirmation processing by transmitting the decryption key confirmation command. Then, after confirming that the decryption key is valid, the AV data is receiving unit 26 subsequently receives the AV data.

On the other hand, when confirming that the request for the outdoor device key is set (YES in S406), the mobile terminal 2 suspends the data transmission, and performs the outdoor-device-authentication and key-exchange processing (S408). Then, the mobile terminal 2 obtains the outdoor device key (Kxr) by the outdoor-device-authentication and key-exchange processing, and transmits the AV data obtainment request command (S409), to start transmitting the AV data using the obtained outdoor device key.

Thus operates the AV data transmission and receiving system according to the first embodiment of the present invention.

Thus, in the AV data transmission and receiving system according to the first embodiment, even when the mobile terminal 2 is carried from indoors to outdoors, and the indoor wireless network 3 is switched to the outdoor wireless network 6, the mobile terminal 2 operates assuming that the mobile terminal 2 is quasi-connected to the indoor wireless network 3 within the allowable range of the DTCP-IP. In other words, the mobile terminal 2 continues using the (ordinary) key for indoor device distribution without switching to the key for outdoor device distribution, within the allowable range of the DTCP-IP. This allows reducing the frequency of key switching, thus reducing overheads resulting from the key switching.

Specifically, in the AV data transmission and receiving system according to the first embodiment, after switching the wireless network 3 to the outdoor wireless network 6, the AV data receiving device continuously uses the ordinary key within the allowable range of the DTCP-IP. Then, the AV data receiving device confirms the number of the relay devices (hop count) when it is necessary to perform the decryption key confirmation processing, and switches to the outdoor device key when a failure in the decryption key confirmation processing can be predicted from the restriction on the number of the relay devices (hop count). Thus, it is possible to reduce the frequency of key switching (frequency of executing the authentication and key exchange processing). More specifically, this AV data receiving device predicts, in advance of starting the decryption key confirmation processing, whether or not the processing will fail or not, and determines, according to the prediction result, whether or not the key should be switched, thus allowing reduction in key switching frequency and overheads resulting from the key switching.

Embodiment 2

Hereinafter, an AV data transmission and receiving system according to a second embodiment of the present invention will be described in detail. The AV data transmission and receiving system according to the second embodiment is different from the AV data transmission and receiving system according to the first embodiment in the structure of the decryption receiving unit 20 included in the mobile terminal 2 that is an AV data receiving device. Since the other configurations are the same as those of the AV data transmission and receiving system according to the first embodiment, the descriptions thereof will be omitted.

Figure 6:
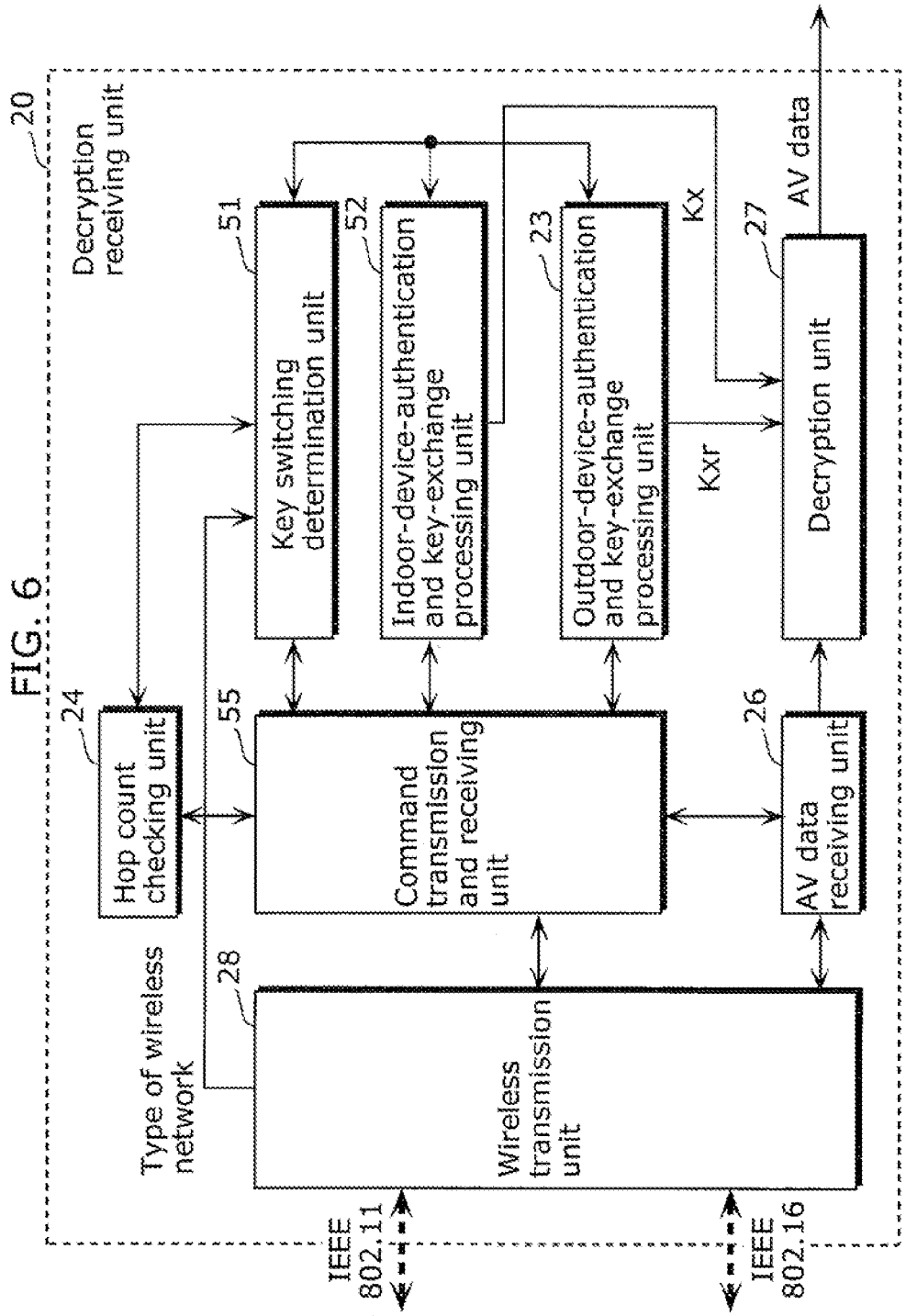
FIG. 6 is a block diagram showing a configuration of a decryption receiving unit in the AV data receiving device according to a second embodiment of the present invention.

FIG. 6 is a block diagram showing a configuration of a decryption receiving unit in the AV data receiving device according to the second embodiment of the present invention. The same constituent elements as those in FIG. 2 are assigned with the same reference signs, and the detailed descriptions thereof will be omitted. The mobile terminal 2 that is the AV data receiving device according to the second embodiment is different from the mobile terminal 2 according to the first embodiment in the configurations of: a key switching determination unit 51; an indoor-device-authentication and key-exchange processing unit 52; and a command transmission and receiving unit 55. Since the other constituent elements are the same as those in the first embodiment, the descriptions thereof will be omitted.

The key switching determination unit 51 which is a characteristic constituent element of the present invention determines, upon receiving the switching confirmation request from the command transmission and receiving unit 55, whether or not switching to the outdoor device key should be performed. Specifically, when receiving, from the command transmission and receiving unit 55, the switching confirmation request for confirming whether or not key switching is necessary, the key switching determination unit 51 confirms: the type of the key currently used for decryption in the decryption unit 27; the type of the wireless network currently used by the wireless transmission unit 28 for the reception; and the hop count received by the hop count checking unit 24. Then, the key switching determination unit 51 determines whether or not switching to the outdoor device key should be performed, according to the type of the key, the type of the wireless network, and the hop count that are confirmed. In addition, the key switching determination unit 51 notifies the command transmission and receiving unit 55, the indoor-device-authentication and key-exchange processing unit 52, and the outdoor-device-authentication and key-exchange processing unit 23 of a result of the determination as to whether or not switching to the outdoor device key should be performed.

The indoor-device-authentication and key-exchange processing unit 52 performs, via the command transmission and receiving device 55 and the wireless transmission unit 28, indoor-device-authentication and key-exchange processing according to the DTCP-IP, reciprocally with the AV server 1 that is the AV data transmission device. The indoor-device-authentication and key-exchange processing unit 52 outputs, to the decryption unit 27, the ordinary key (Kx) that is obtained by performing the indoor-device-authentication and key-exchange processing. Note that the indoor-device-authentication and key-exchange processing unit 52 finishes the authentication and key exchange processing when receiving, from the key switching determination unit 51, the determination result that the outdoor device key is necessary.

The command transmission and receiving unit 55 transmits and receives the command to and from the AV server 1 via the wireless transmission unit 28. Specifically, the command transmission and receiving unit 55 is controlled by the indoor-device-authentication and key-exchange processing unit 52, the outdoor-device-authentication and key-exchange processing unit 23, the hop count checking unit 24, and the decryption unit 27, and performs the transmission and receiving processing which is to transmit and receive different types of commands and command responses to and from the AV server 1 via the wireless transmission unit 28. For example, it is assumed that the indoor-device-authentication and key-exchange processing unit 52 requests the command transmission and receiving unit 55 to transmit an authentication and key exchange activation command. In this case, prior to transmitting the authentication and key exchange activation command to the AV server 1, the command transmission and receiving unit 55 transmits, to the key switching determination unit 51, the switching confirmation request to confirm whether or not key switching is necessary. When receiving, from the key switching determination unit 51, the determination result that the outdoor device key is necessary, the command transmission and receiving unit 55 does not transmit the authentication and key exchange activation command to the AV server 1. In addition, for example, the command transmission and receiving unit 55 transmits and receives the authentication and key exchange command related to the indoor device key and the decryption key confirmation command as follows. When transmitting the command, the command transmission and receiving unit 55 sets, to 3, the TTL of an IP packet corresponding to the authentication and key exchange command or the decryption key confirmation command that is to be transmitted. On the other hand, in receiving, the command transmission and receiving unit 55 checks the TTL of the IP packet corresponding to the authentication and key exchange command or decryption key confirmation command that is received, and discards the command as an improper command when the TTL is 4 or above.

Thus configured is the AV data receiving device according to the second embodiment of the present invention.

The following will describe an operation of the AV data transmission and receiving system including the AV data transmission device and the AV data receiving device that are configured as above.

Figure 7:
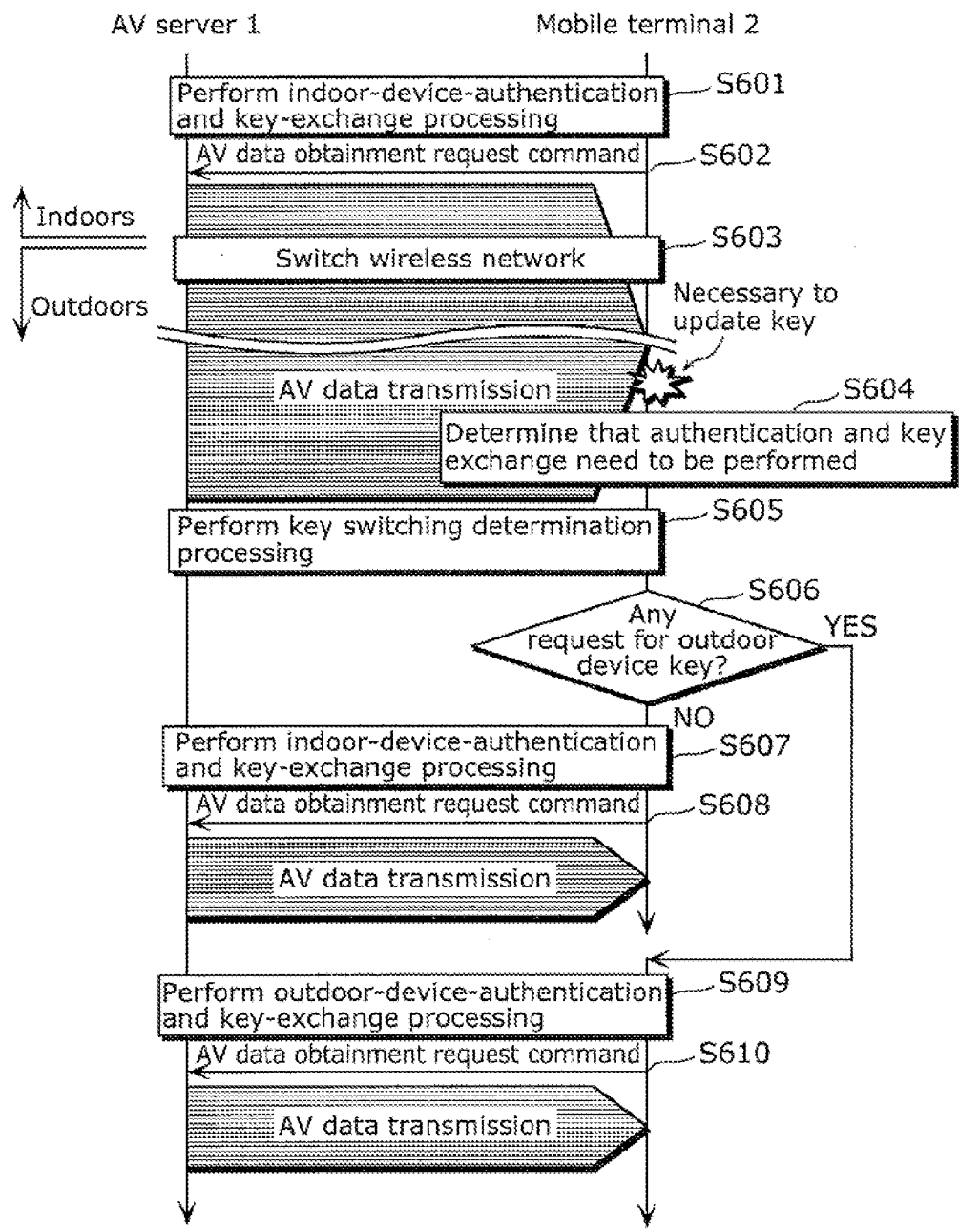
FIG. 7 is a diagram showing an execution sequence of an AV data transmission and receiving system according to the second embodiment of the present invention.
Figure 8:
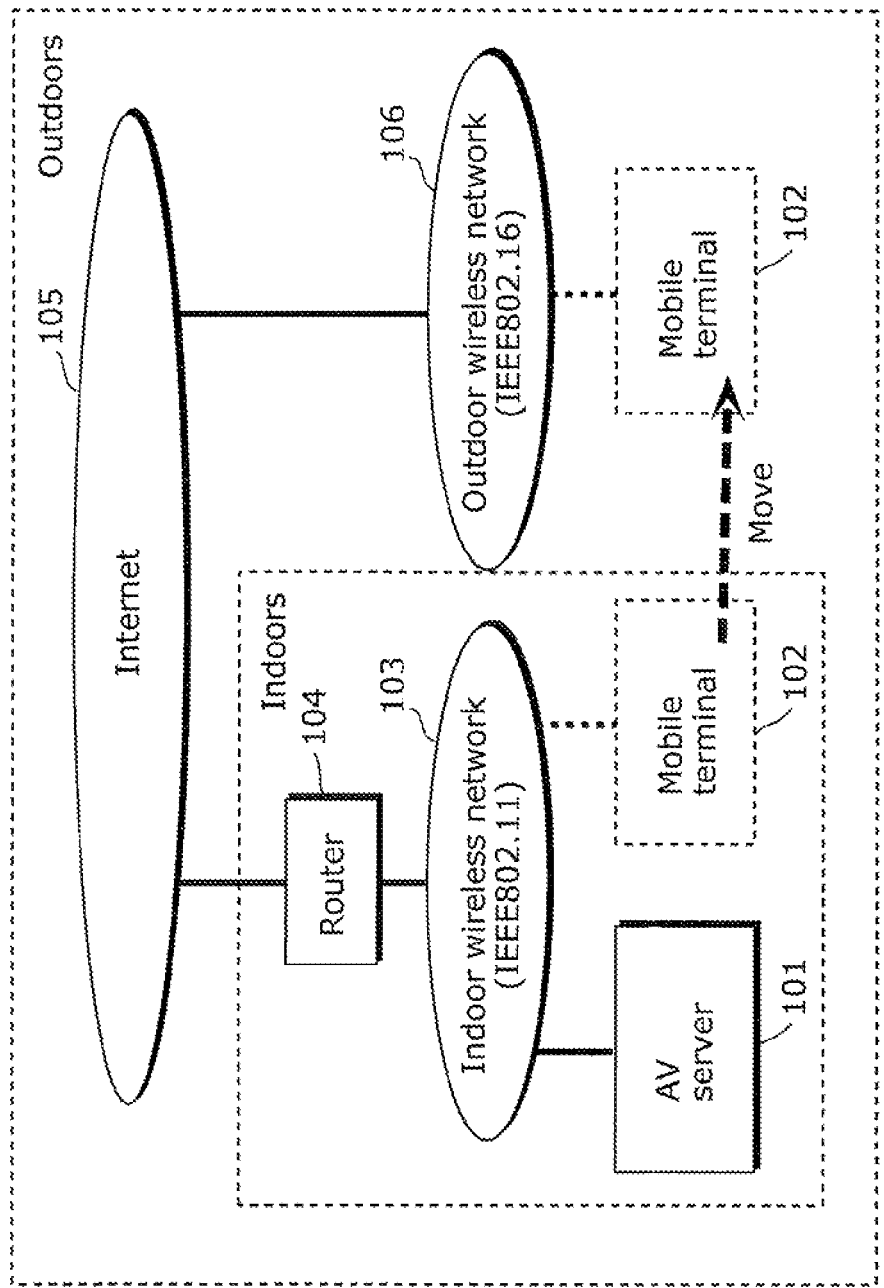
FIG. 8 is a diagram showing a configuration of a conventional AV data transmission and receiving system.
Figure 9:
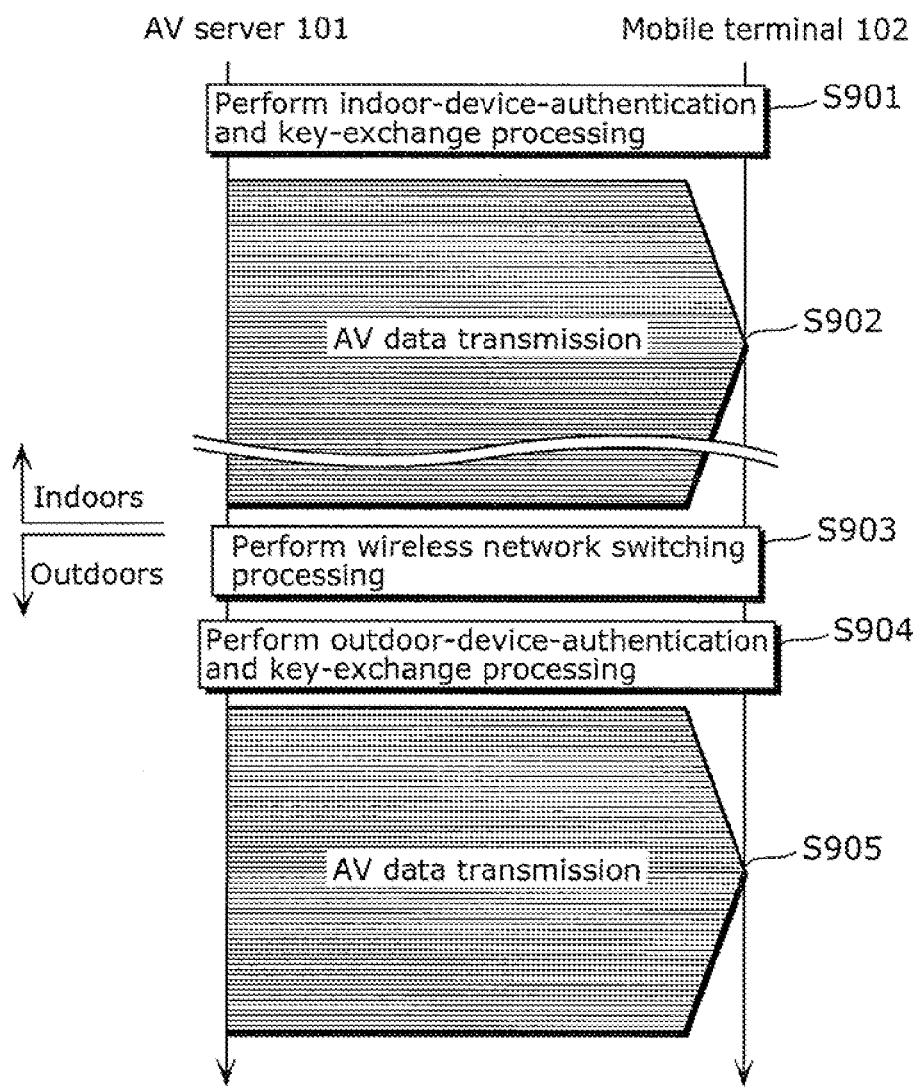
FIG. 9 is a sequence diagram showing an operation performed in the conventional AV data transmission and receiving system when a mobile terminal is moved from indoors to outdoors while receiving the content from an AV server.

FIG. 7 is a diagram showing an execution sequence of the AV data transmission and receiving system according to the second embodiment of the present invention.

First, it is assumed that the mobile terminal 2 is located indoors. The mobile terminal 2, when connected to the indoor wireless network, performs the indoor-device-authentication and key-exchange processing (S601). Specifically, in the mobile terminal 2, the indoor-device-authentication and key-exchange processing unit 52 performs the ordinary authentication and key exchange processing reciprocally with the AV server 1. Then, the ordinary key (Kx) is obtained.

Next, the mobile terminal 2 transmits the AV data obtainment request command to the AV server 1 (S602), receives the AV data from the AV server 1, and starts decrypting the AV data.

Next, when moving the mobile terminal 2 from indoors to outdoors, the mobile terminal 2 switches the wireless network (S603). Specifically, in the mobile terminal 2, the wireless transmission unit 28 switches the wireless network from the indoor wireless network 3 to the outdoor wireless network 6.

Here, in the AV server 1, in some cases, the key used for encryption is updated as a result of, for example, connection cutoff or the like in the indoor wireless network 3. Specifically, in some cases, the AV server 1, as a result of the connection cutoff or the like in the indoor wireless network 3, updates the key used for authentication, encrypts the AV data to be transmitted to the mobile terminal 2, using a key generated from the updated key used for the authentication, and transmits, to the mobile terminal 2, the AV data encrypted using the updated key. In this case, since the current key for decryption does not allow the mobile terminal 2 to decode the AV data received from the AV server 1, it is necessary to update the key for the decryption. In other words, the mobile terminal 2 determines that it is necessary to newly perform authentication and key exchange processing because the key currently used for the decryption does not allow decrypting the AV data that is received (S604).

Then, the mobile terminal 2 performs key switching determination processing reciprocally with the AV server 1 (S605), and confirms whether or not the request for the outdoor device key is set as a result of the key switching determination processing (S606). Specifically, when confirming that the key currently used by the AV data receiving unit 26 for the decryption is invalid, the mobile terminal 2 stops output of the encrypted AV data to the decryption unit 27, to cause the decryption unit to stop performing the decryption. Based on the stop of the decryption in the decryption unit 27, the key switching determination unit 51 determines that it is necessary to update the key for the decryption, and activates the indoor-device-authentication and key-exchange processing unit 52. The indoor-device-authentication and key-exchange processing unit 52, when activated, starts the key exchange processing. In other words, the indoor-device-authentication and key-exchange processing unit 52 requests the command transmission and receiving unit 55 to transmit the authentication and key exchange activation command to the AV server 1. The command transmission and receiving unit 55, prior to transmitting the authentication and key exchange activation command to the AV server 1, outputs a switching confirmation request to the key switching determination unit 51. The key switching determination unit 51, upon receiving the switching confirmation request from the command transmission and receiving unit 55, determines whether or not switching to the outdoor device key should be performed.

Next, when confirming that the request for the outdoor device key is not set, that is, when the request for the outdoor device key has been reset (NO in S606), the mobile terminal 2 directly performs the indoor-device-authentication and key-exchange processing (S607) to obtain the ordinary key. Then, the mobile terminal 2 transmits the AV data obtainment request command to the AV server 1 (S608), and starts transmitting the AV data using the ordinary key that is newly obtained.

Specifically, since, in the mobile terminal 2, the key switching determination unit 51 determines that switching to the outdoor device key is not necessary, the command transmission and receiving unit 55 transmits the indoor-device-authentication and key-exchange processing command to the AV server 1, to perform the indoor-device-authentication and key-exchange processing. Then, the AV data receiving unit 26 receives the AV data after obtaining a new ordinary key, and transmits the AV data with the new ordinary key to the decryption unit 27. Thus, the mobile terminal 2 starts transmitting the AV data using the ordinary key that is newly obtained.

On the other hand, when confirming that the request for the outdoor device key is set (YES in S606), the mobile terminal 2 performs the outdoor-device-authentication and key-exchange processing (S609). Then, the mobile terminal 2 obtains the outdoor device key (Kxr) by the outdoor-device-authentication and key-exchange processing, and transmits the AV data obtainment request command (S610), to start transmitting the AV data using the outdoor device key that is newly obtained.

Thus configured is the AV data transmission and receiving system according to the second embodiment of the present invention.

Thus, in the AV data transmission and receiving system according to the second embodiment, even when the mobile terminal 2 is carried from indoors to outdoors, and the indoor wireless network 3 is switched to the outdoor wireless network 6, the mobile terminal 2 operates assuming that the mobile terminal 2 is quasi-connected to the indoor wireless network 3 within the allowable range of the DTCP-IP. In other words, the mobile terminal 2 continues using the (ordinary) key for indoor device distribution within the allowable range of the DTCP-IP, without switching to the key for outdoor device distribution. This allows reducing the frequency of key switching, thus reducing overheads resulting from the key switching.

Specifically, in the AV data transmission and receiving system according to the second embodiment, even after the wireless network 3 is switched to the outdoor wireless network 6, the AV data receiving device also uses the ordinary key within the allowable range of the DTCP-IP. Then, the AV data receiving device performs authentication and key exchange processing when it is determined is that new authentication and key exchange processing should be performed. Accordingly, it is possible to reduce the frequency of executing the authentication and key exchange processing.

In other words, this AV data receiving device checks the number of the relay devices (hop count), and performs outdoor-device-authentication and key-exchange processing when predicting a failure in the ordinary authentication and key exchange processing from the restriction on the number of the relay devices (hop count). Thus, it is possible to reduce the frequency of switching from the ordinary key to the outdoor device key.

In addition, the AV data receiving device predicts, in advance of starting the authentication and key exchange processing, whether the processing may fail or not, and switches, according to the prediction result, the authentication and key exchange processing to be executed, between the outdoor-device-authentication and key-exchange processing and the indoor-device-authentication and key-exchange processing, thus allowing reducing overheads resulting from the key switching.

As described above, according to an implementation of the present invention, it is possible to realize an AV data receiving device, an AV data receiving method, and an AV data transmission and receiving system which reduce frequency of key switching as well as reducing overheads resulting from the key switching. Specifically, it is to reduce, while using the DTCP-IP, the frequency of key switching between the indoor network environment and the outdoor network environment to a maximum extent within an allowable range of the DTCP-IP. This allows reducing overheads resulting from the key switching.

Note that in each of the embodiments of the present invention, IEEE802.11 is used for the indoor wireless network 3, and IEEE802.16 is used for the outdoor wireless network 6, but the wireless media system is not limited to these. In addition, optical communication and other transmission systems may be used as long as they are non-contact transmission systems.

In addition, the AV data transmission and receiving system according to the present invention uses different wireless media between indoors and outdoors, but the same wireless medium may be used for indoors and outdoors to determine whether to use the indoor network or the outdoor network.

In addition, the AV data transmission and receiving system according to an implementation of the present invention determines whether key switching should be performed, before the decryption key confirmation command or the authentication and key exchange activation command is transmitted, but may perform the determination before another command for restricting the number of the relay devices is transmitted.

As described above, the AV data transmission and receiving devices, the AV data transmission and receiving method, and the AV data transmission and receiving system which transmit and receive the AV data according to an implementation of the present invention have been described, but the present invention is not limited to these embodiments. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to an AV data receiving device, an AV data receiving method, and an AV data transmission and receiving system, and is particularly applicable to an AV data receiving device, an AV data receiving method, and an AV data transmission and receiving system which allow an access to an AV data transmission device located indoors from both indoor and outdoor network environments using the same AV data receiving device, and allow receiving the AV data whose copyright is protected.

REFERENCE SIGNS LIST 1, 101 AV server
2, 102 Mobile terminal
3, 103 Indoor wireless network
4, 104 Router
5, 105 Internet
6, 106 Outdoor wireless network
20 Decryption receiving unit
21, 41 Key switching determination unit
22, 32, 52 Indoor-device-authentication and key-exchange processing unit
23, 33 Outdoor-device-authentication and key-exchange processing unit
24, 34 Hop count checking unit
25, 35, 55 Command transmission and receiving unit
26 AV data receiving unit
27 Decryption unit
28, 38 Wireless transmission unit
30 Encryption transmission unit
31 Authentication and key exchange processing switching unit
36 Encryption unit
37 AV data transmission unit

The invention claimed is:

1. An audio-visual (AV) data receiving device comprising:
an AV data receiving unit configured to receive, from an AV data transmission device, AV data encrypted and transmitted by the AV data transmission device according to a method for protecting copyright on a network;
a decryption unit configured to decrypt the encrypted AV data;
a relay device number checking unit configured to check whether the number of relay devices which relay transmission between the AV data transmission device and said AV data receiving device on the network is equal to or smaller than a predetermined value;
a command transmission and receiving unit configured to transmit and receive a command to and from the AV data transmission device;
a first authentication and key exchange unit configured to perform first authentication for checking the number of the relay devices by causing said command transmission and receiving unit to transmit and receive the command to and from the AV data transmission device, and is configured to exchange first key information with the AV data transmission device;
a second authentication and key exchange unit configured to perform second authentication not involving checking of the number of the relay devices and exchange second key information, reciprocally with the AV data transmission device; and
a key information switching unit configured to determine whether or not the first key information should be switched to the second key information,
wherein, before said command transmission and receiving unit is caused to transmit and receive a command for restricting the number of the relay devices to and from the AV data transmission device, said key information switching unit is configured to cause said relay device number checking unit to check the number of the relay devices, and is configured to determine, when the number of the relay devices is larger than the predetermined value, that the first key information should be switched to the second key information, so that said command transmission and receiving unit is not caused to transmit and receive the command to and from the AV data transmission device,
said second authentication and key exchange unit is configured to perform the second authentication and exchange the second key information, according to the determination by said key information switching unit, and
said decryption unit is configured to decrypt the encrypted AV data, using the second key information obtained by said second authentication and key exchange unit.

2. The AV data receiving device according to claim 1,
wherein said key information switching unit is configured to cause said relay device number checking unit to check the number of the relay devices, and determine, when the number of the relay devices is equal to or smaller than the predetermined value, that switching to the second key information should not be performed,
said first authentication and key exchange unit is configured to perform the first authentication and exchange the first key information, according to the determination by said key information switching unit, and
said decryption unit is configured to continue decrypting the encrypted AV data, using the first key information.

3. The AV data receiving device according to claim 1,
wherein said key information switching unit, when said AV data receiving device is connected to an outdoor network, is configured to determine whether or not the first key information should be switched to the second key information, before said command transmission and receiving unit is caused to transmit, to the AV data transmission device connected to an indoor network, the command for restricting the number of the relay devices.

4. The AV data receiving device according to claim 1,
wherein said key information switching unit is configured to determine whether or not the first key information should be switched to the second key information, before said command transmission and receiving unit is caused to transmit, to the AV data transmission device, a command to confirm validity of key information for generating a decryption key for decrypting the encrypted AV data.

5. The AV data receiving device according to claim 1,
wherein said key information switching unit is configured to determine whether or not the first key information should be switched to the second key information, before said command transmission and receiving unit is caused to transmit, to the AV data transmission device, a command to start the first authentication and key exchange processing.

6. An AV data receiving method used for an audio-visual (AV) data receiving device, said method comprising:
receiving, from an AV data transmission device, AV data encrypted and transmitted by the AV transmission device according to a method for protecting copyright on a network;
decrypting the encrypted AV data;
checking whether the number of relay devices which relay transmission between the AV data transmission device and the AV data receiving device on the network is equal to or smaller than a predetermined value;
transmitting and receiving a command to and from the AV data transmission device;
performing first authentication for checking the number of the relay devices by causing the command to be transmitted between the AV data transmission device and the AV data receiving device in said transmitting and receiving, and exchanging first key information with the AV data transmission device;

performing second authentication not involving checking of the number of the relay devices and exchanging second key information, reciprocally with the AV data transmission device; and determining whether or not the first key information should be switched to the second key information, wherein, in said determining, the number of the relay devices is checked in said checking before a command for restricting the number of the relay devices is caused to be transmitted and received to and from the AV data transmission device in said transmitting and receiving, and it is determined, when the number of the relay devices is larger than the predetermined value, that the first key information should be switched to the second key information, so that the command is not transmitted or received to and from the AV data transmission device in said transmitting and receiving, in said performing second authentication, the second authentication is performed and the second key information is exchanged, according to the determination performed in said determining, and in said decrypting, the encrypted AV data is decrypted using the second key information obtained in said performing second authentication.

7. An audio-visual (AV) data transmission and receiving system in which an AV data transmission device and an AV data receiving device transmit and receive AV data to and from each other via an indoor or outdoor network, said AV data transmission device transmitting the AV data, and said AV data receiving device receiving the AV data, wherein said AV data transmission device includes:

an encryption unit configured to encrypt the AV data according to a method for protecting copyright on a network;

an AV data transmission unit configured to transmit, to said AV data receiving device, the AV data encrypted according to the method;

a first decryption unit configured to decrypt the encrypted AV data;

a first relay device number checking unit configured to check that the number of relay devices which relay transmission between said AV data transmission device and said AV data receiving device on the network is equal to or smaller than a predetermined value;

a first command transmission and receiving unit configured to transmit and receive a command to and from said AV data receiving device;

a first authentication and key exchange unit configured to perform first authentication for checking the number of the relay devices by causing said first command transmission and receiving unit to transmit and receive the command to and from said AV data transmission device, and exchange first key information with said AV data transmission device;

a second authentication and key exchange unit configured to perform second authentication not involving checking of the number of relay devices and exchange the second key information, reciprocally with said AV data transmission device; and an authentication and key exchange selection unit configured to select and cause to operate, according to the command received by said first command transmission and receiving unit, one of said first authentication and key exchange unit and said second authentication and key exchange unit, said AV data receiving device includes:

an AV data receiving unit configured to receive, from said AV data transmission device, the AV data encrypted according to the method;

a second decryption unit configured to decrypt the encrypted AV data;

a second relay device number checking unit configured to check whether the number of the relay devices which relay transmission between said AV data transmission device and said AV data receiving device on the network is equal to or smaller than a predetermined value;

a second command transmission and receiving unit configured to transmit and receive the command to and from said AV data transmission device;

a third authentication and key exchange unit configured to perform the first authentication for checking the number of the relay devices by causing said second command transmission and receiving unit to transmit and receive the command to and from said AV data transmission device, and exchange the first key information;

a fourth authentication and key exchange unit configured to perform the second authentication not involving checking of the number of relay devices and exchange the second key information, reciprocally with said AV data transmission device; and a key information switching unit configured to determine whether or not the first key information should be switched to the second key information, said key information switching unit is configured to cause said relay device number checking unit to check the number of the relay devices, before said second command transmission and receiving unit is caused to transmit and receive the command to and from said AV data transmission device, and is configured to determine, when the number of the relay devices is larger than the predetermined value, that the first key information should be switched to the second key information, so that said second command transmission and receiving unit is not caused to transmit and receive the command to and from said second command transmission and receiving unit, said fourth authentication and key exchange unit is configured to perform the second authentication and exchange the second key information, according to the determination by said key information switching unit, and said second decryption unit is configured to decrypt the encrypted AV data, using the second key information obtained by said second authentication and key exchange unit.

8. A non-transitory computer-readable recording medium on which a program for an AV data receiving device to receive audio-visual (AV) data, the program causing a computer to execute:

receiving, from an AV data transmission device, AV data encrypted and transmitted according to a method for protecting copyright on a network;

decrypting the encrypted AV data;

checking whether the number of relay devices which relay transmission between the AV data transmission device and the AV data receiving device on the network is equal to or smaller than a predetermined value;

transmitting and receiving a command to and from the AV data transmission device;

performing first authentication for checking the number of the relay devices by causing the command to be transmitted between the AV data transmission device and the AV data receiving device in the transmitting and receiving, and exchanging first key information with the AV data transmission device;

performing second authentication not involving checking of the number of the relay devices and exchanging second key information, reciprocally with the AV data transmission device; and determining whether or not the first key information should be switched to the second key information, wherein, in the determining, the number of the relay devices is checked in the checking before a command for restricting the number of the relay devices is caused to be transmitted and received to and from the AV data transmission device in the transmitting and receiving, and it is determined, when the number of the relay devices is larger than the predetermined value, that the first key information should be switched to the second key information, so that the command is not transmitted or received to and from the AV data transmission device in the transmitting and receiving, in the performing second authentication, the second authentication is performed and the second key information is exchanged, according to the determination performed in the determining, and in the decrypting, the encrypted AV data is decrypted using the second key information obtained in the performing second authentication.

* * * * *